C. L. HEYERMANS.
STEERING MECHANISM FOR MOTOR VEHICLES.
APPLICATION FILED JULY 20, 1917.
1,312,909.
Patented Aug. 12, 1919.
2 SHEETS—SHEET 1.
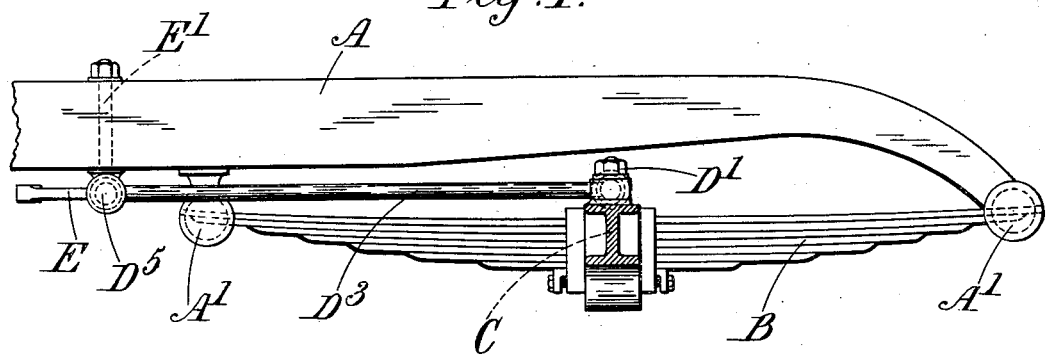
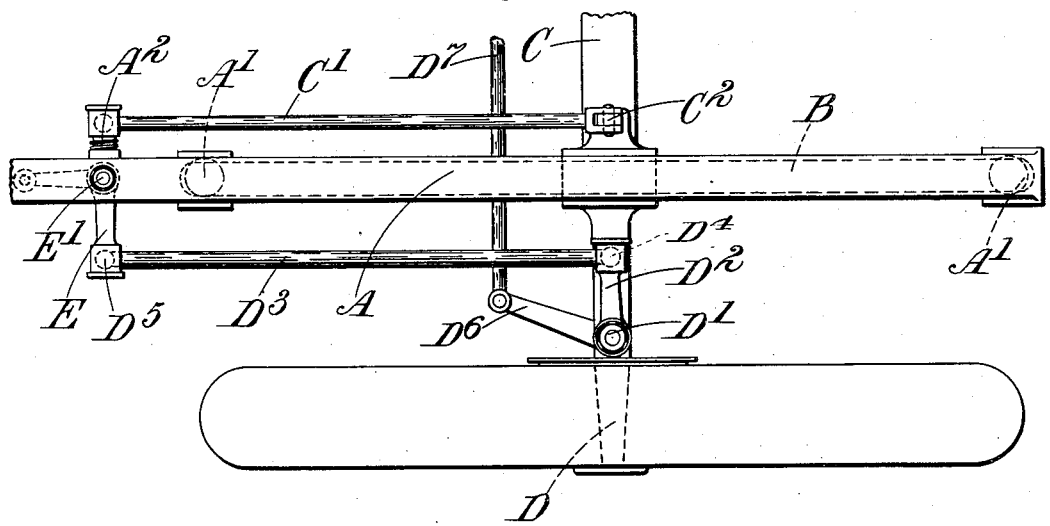
Witnesses,
Inventor
Charles L. Heyermans

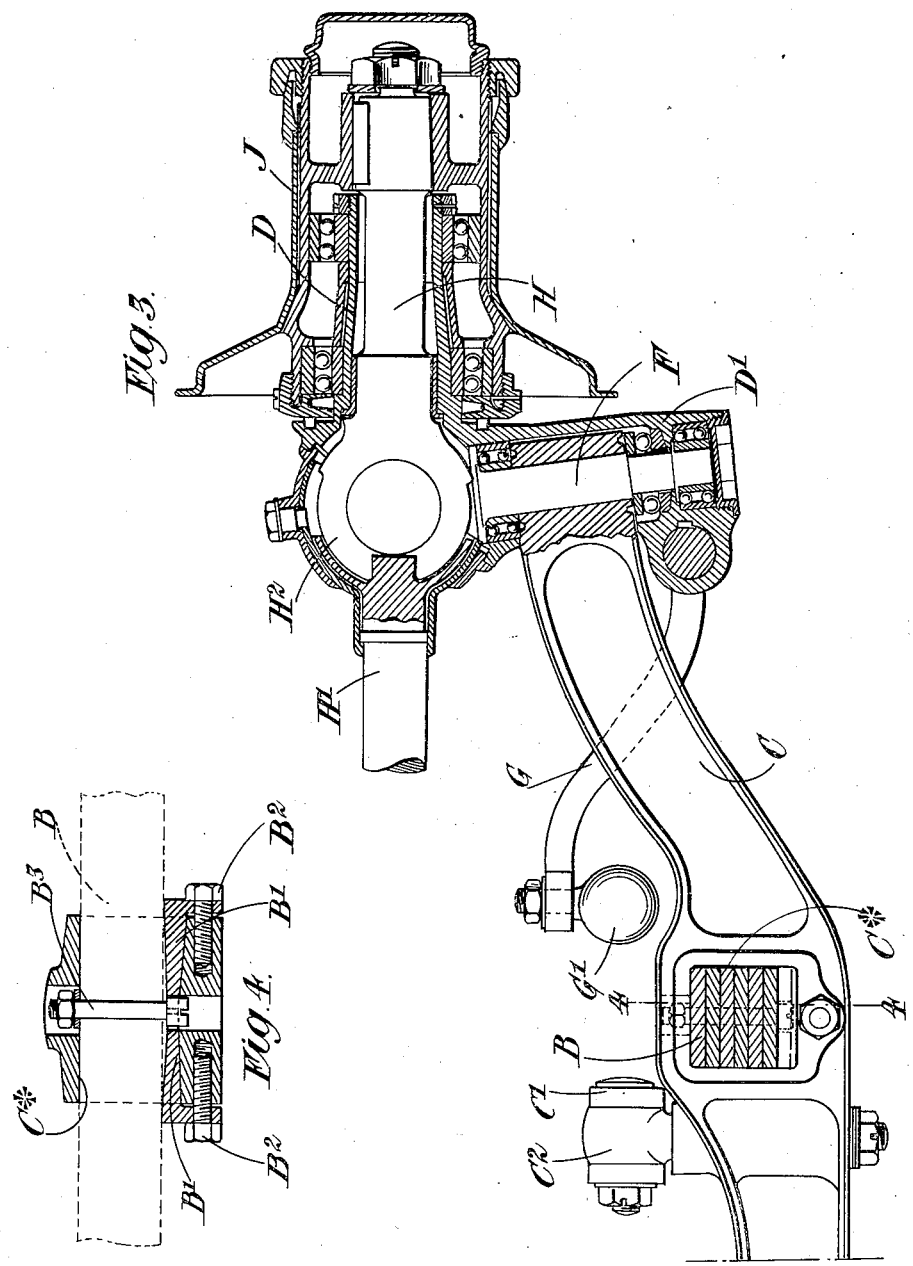

//UNITED STATES PATENT OFFICE.

CHARLES LOUIS HEYERMANS, OF LONDON, ENGLAND, ASSIGNOR OF ONE-HALF TO CECIL HENRY ARTHUR EDYE, OF LONDON, ENGLAND.

STEERING MECHANISM FOR MOTOR-VEHICLES.

1,312,909.  Specification of Letters Patent.  Patented Aug. 12, 1919.

Application filed July 20, 1917. Serial No. 181,751.

*To all whom it may concern:*

Be it known that I, CHARLES LOUIS HEYERMANS, a subject of the King of Belgium, residing in London, England, have invented certain new and useful Improvements in Steering Mechanism for Motor-Vehicles, of which the following is a specification.

This invention is for improvements in or relating to steering-mechanism for motor-vehicles, and has for its object to provide an arrangement of steering-mechanism which will prevent the independent rising and falling of the steering-wheels with the flexing of the springs, whereby the axle is carried, from diverting the wheels from the straight-ahead position when they are in line for straight-ahead running. It is well-known that when a car is running straight-ahead and one or both of the wheels are lifted, for example by passing over an uneven portion of the road, torsional strain is put upon the springs and the displacement of the axle relatively to the chassis causes the steering-mechanism to be pulled upon so that the steering-wheels are slightly slewed or diverted from the straight-ahead position.

According to this invention, there are combined with the front axle carried by leaf-springs whose ends are free to slide relatively to the chassis they support, parallel radius-rods pivotally connecting the axle to the chassis, one for each end of the axle, and a steering-link pivotally connecting the arm of one of the stub-shafts to an operating-member so carried on the chassis as to move bodily therewith which link is so positioned (for example placed with one or both of its pivot-points on the same axes as those of the radius-rods) that the stub-shaft end shall move through an arc whose distance from the point of pivoting of the link in a vertical longitudinal plane is the same as the length of the radius-rods.

In the accompanying drawings—

Figure 1 is a diagrammatic view of the steering-mechanism as seen in elevation;

Fig. 2 is a diagrammatic view in plan of the right-hand portion of the steering-mechanism illustrated in Fig. 1;

Fig. 3 is a front view of the near side end of a steering-axle with its stub-shaft and associated parts partly in central vertical section on the line of the stub-shaft, and Fig. 4 is a section on the line 4—4 of Fig. 3.

The same letters indicate the same parts throughout the drawings.

Each longitudinal member A of the chassis (that on the off-side of the vehicle only is shown in Figs. 1 and 2) has secured beneath it a leaf-spring B whose ends are free to slide endwise in their securing means $A^1$.

The steering-wheel axle C is secured to the springs B and near each of the longitudinal-members A is a radius-rod $C^1$. Only one radius-rod is shown in the drawings, but it will be appreciated that the parts shown in Figs. 1 and 2 are all repeated on the near side of the vehicle. The radius-rod $C^1$ is pivotally connected at $C^2$ to a pin which can swivel about a vertical axis in the axle C so that the ordinary hinging movement caused by both of the front wheels rising and falling together is about an axis transverse to the vehicle and the swiveling movement permits of such turning as is necessary when one wheel rises and the other does not correspondingly rise. The other end of the radius-rod $C^1$ is pivotally connected to a part $A^2$ which may be rigidly secured to the frame-member A. The connection between the rod and the part $C^2$ is preferably of a universal character such as is provided by a ball-and-socket.

The road-wheels are carried each by a hollow stub-shaft D pivoted at $D^1$ to the axle C in the usual manner one of them having an arm $D^2$ for connection to the steering-mechanism. A link $D^3$ is pivoted at $D^4$ to the end of the arm $D^2$ and at the other end is connected by any convenient means to an operating member so carried on the chassis as to move bodily therewith. In the diagrammatic drawings of Figs. 1 and 2 the link $D^3$ is shown as pivoted at $D^5$ by a ball-and-socket connection to a bell-crank lever E, which in turn is pivoted at $E^1$ to the frame-member A. Only one operating-arm $D^2$ and connecting-mechanism is of course required as each of the stub-shafts carries the usual arm D⁶ for interconnection by the rod D⁷ commonly used in the Ackermann type of steering-gear.

It will be seen that when the steering-wheels are in the straight-ahead position, the link D³ which is parallel to the radius-rod C¹ has its axes of pivoting on the same transverse lines as those of the radius-rods. It follows therefore that if the off-side stub-shaft D is made to rise through its wheel passing over an obstacle so that the spring B is flexed upward, this movement will conform to an arc of a circle which lies in an approximately vertical plane and has for center the axis of pivoting of the radius-rod C¹ about the member A² which is secured to the chassis, and as the link D³ is of the same length as the radius-rod and its axes of pivoting are on the same transverse lines as those of the radius-rod, there will be no tendency to swing the arm D² about its pivotal point D¹ and thus cause the road-wheels to be diverted from the position for straight-ahead driving.

Figs. 3 and 4 show one practical way of carrying out the invention. The axle C provides a bearing-member F about which the hollow stub-shaft D pivots for steering purposes, and moving in one with the stub-shaft is an arm G which corresponds to the arm D² of Fig. 2. This arm carries at its end a ball G¹ for connection to the link D³ whose other end is connected to the steering-mechanism and the radius-rod C¹ is hinged to a lug C² secured to the axle C.

For securing the center of the spring B to the axle, an orifice C* is provided in the axle, the spring is placed therein and is wedged tight by wedge-blocks B¹ which are driven home by screws B². A central bolt B³ extends through the various members of the spring to further secure them together.

The construction shown in Fig. 3 is intended for steering-wheels which are driven. For this purpose a driving-spindle H is mounted within the hollow stub-shaft and has driving connection with the wheel-hub J, the spindle H having at its other end driving connection with a shaft H¹ through a universal joint H² of the spherical type. These parts constitute no feature *per se* of the present invention and therefore need not be described in detail, and the driving-shaft H¹ may be operatively connected with the engine by any suitable means which do not constitute any part of the present invention.

What I claim as my invention and desire to secure by Letters Patent is—

1. In steering mechanism for motor-vehicles the combination with a front axle carried by leaf-springs whose ends are free to slide relatively to the chassis they support, of parallel longitudinally extending radius-rods pivotally connected to the axle and to the chassis, one for each end of the axle, and a steering-link pivotally connected the arm of one of the stub-shafts to an operating-member so carried on the chassis as to move bodily therewith which link has its axes of pivoting on the same transverse lines as those of the radius-rods, for the purpose set forth.

2. In steering-mechanism for motor-vehicles, the combination with a front axle carried by leaf-springs whose ends are free to slide relatively to the chassis they support, of parallel longitudinally extending radius-rods pivotally connected to the axle and to the chassis one for each end of the axle, and a steering link pivotally connecting the arm of one of the stub-shafts to an operating-member so carried on the chassis as to move bodily therewith, which link is so positioned that the stub-shaft end shall move through an arc whose distance from the point of pivoting of the link in a vertical longitudinal plane is the same as the length of the radius-rods, for the purpose set forth.

3. In steering-mechanism for motor-vehicles the combination with a front axle carried by leaf-springs whose ends are free to slide relatively to the chassis they support, of radius-rods pivotally connected to the axle and to the chassis, one for each end of the axle, and a steering-link pivotally connecting the arm of one of the stub-shafts to an operating-member so carried on the chassis as to move bodily therewith which link is of the same length as the radius-rods and has its axis of pivoting at the operating-member end on the same transverse line as the axes of the corresponding ends of the radius-rods, for the purpose set forth.

In testimony whereof I have signed my name to this specification.

CHARLES LOUIS HEYERMANS.